(12) United States Patent
Diehl et al.

(10) Patent No.: US 11,050,336 B2
(45) Date of Patent: Jun. 29, 2021

(54) METHODS OF ALTERING EDDY CURRENT INTERACTIONS

(71) Applicant: Eddy Current Limited Partnership, Wellington (NZ)

(72) Inventors: Andrew Karl Diehl, Wellington (NZ); Kevin A. Wright, Wellington (NZ); Weston Hill, Wellington (NZ); Dave Walters, Wellington (NZ)

(73) Assignee: EDDY CURRENT LIMITED PARTNERSHIP, Wellington (NZ)

( * ) Notice: Subject to any disclaimer, the term of this patent is extended or adjusted under 35 U.S.C. 154(b) by 368 days.

(21) Appl. No.: 15/532,472

(22) PCT Filed: Dec. 4, 2015

(86) PCT No.: PCT/NZ2015/050206
§ 371 (c)(1),
(2) Date: Jun. 1, 2017

(87) PCT Pub. No.: WO2016/089226
PCT Pub. Date: Jun. 9, 2016

(65) Prior Publication Data
US 2018/0269767 A1 Sep. 20, 2018

(30) Foreign Application Priority Data

Dec. 4, 2014 (NZ) .................................... 701548

(51) Int. Cl.
*H02K 49/04* (2006.01)
*H02K 49/00* (2006.01)
(Continued)

(52) U.S. Cl.
CPC ............. *H02K 49/04* (2013.01); *H02K 7/104* (2013.01); *H02K 49/00* (2013.01); *H02K 49/046* (2013.01);
(Continued)

(58) Field of Classification Search
CPC ........ H02K 49/00; H02K 49/02; H02K 49/04; H02K 49/043; H02K 49/046; H02K 49/06;
(Continued)

(56) References Cited

U.S. PATENT DOCUMENTS 2,058,024 A    10/1936  Logan, Jr.
2,122,312 A     6/1938  Cassion
(Continued)

FOREIGN PATENT DOCUMENTS

CN    1783674 A      6/2006
CN  101820952 A      9/2010
(Continued)

OTHER PUBLICATIONS

Yanding Wei; Yuanjing Guo; Ziaojun Zhou; Jianjun Li; Mangmang Huang; Zhuhui Luo, Permanent Magnet Eddy Current Retarder based Halbach Array, Jun. 13, 2012, Zhejiang University, CN 102497085 (English Machine Translation) (Year: 2012).*
(Continued)

*Primary Examiner* — Quyen P Leung
*Assistant Examiner* — Alexander A Singh
(74) *Attorney, Agent, or Firm* — Seed Intellectual Property Law Group LLP (57) ABSTRACT

Described herein are braking mechanisms and related methods of using eddy current interactions to resist relative movement between members, the magnetic flux about an eddy current region being modified beyond an inherent drag effect resulting from a simple magnetic pole arrangement.

7 Claims, 4 Drawing Sheets

(51) Int. Cl.
  *H02K 7/104*   (2006.01)
  *A62B 1/08*    (2006.01)
  *F16D 63/00*   (2006.01)
  *A62B 35/00*   (2006.01)
  *A62B 1/14*    (2006.01)

(52) U.S. Cl.
  CPC . *A62B 1/08* (2013.01); *A62B 1/14* (2013.01); *A62B 35/0093* (2013.01); *F16D 63/002* (2013.01)

(58) Field of Classification Search
  CPC ...... H02K 49/065; H02K 49/08; H02K 49/10; H02K 49/102; H02K 49/104; H02K 49/106; H02K 49/108; H02K 49/12; H02K 7/104; H02K 7/106; H02K 7/12; F16D 37/02; F16D 27/00; F16D 29/00; F16D 63/00; F16D 63/002; F16D 63/004; F16D 63/006; F16D 63/008; A62B 1/08; A62B 1/14; A62B 35/0093
  See application file for complete search history.

(56) References Cited

U.S. PATENT DOCUMENTS

| | | | |
|---|---|---|---|
| 2,122,315 A | 6/1938 | Fosty et al. | |
| 2,272,509 A | 2/1942 | Cavallo | |
| 2,409,009 A | 10/1946 | Bakke | |
| 2,428,104 A | 9/1947 | Winther | |
| 2,437,871 A | 3/1948 | Wood | |
| 2,492,776 A | 12/1949 | Winther | |
| 2,771,171 A | 11/1956 | Schultz | |
| 2,807,734 A | 9/1957 | Lehde | |
| 3,364,795 A | 1/1968 | De Coye De Castelet | |
| 3,447,006 A | 5/1969 | Bair | |
| 3,721,394 A | 3/1973 | Reiser | |
| 3,868,005 A | 2/1975 | McMillan | |
| 3,934,446 A | 1/1976 | Avitzur | |
| 3,962,595 A | 6/1976 | Eddens | |
| 3,967,794 A | 7/1976 | Fohl | |
| 4,078,719 A | 3/1978 | Durland et al. | |
| 4,093,186 A | 6/1978 | Golden | |
| 4,224,545 A | 9/1980 | Powell | |
| 4,271,944 A | 6/1981 | Hanson | |
| 4,306,688 A | 12/1981 | Hechler, IV | |
| 4,416,430 A | 11/1983 | Totten | |
| 4,434,971 A | 3/1984 | Cordrey | |
| 4,544,111 A * | 10/1985 | Nakajima | A01K 89/01555 188/267 |
| 4,561,605 A | 12/1985 | Nakajima | |
| 4,567,963 A | 2/1986 | Sugimoto | |
| 4,612,469 A | 9/1986 | Muramatsu | |
| 4,676,452 A | 6/1987 | Nakajima | |
| 4,690,066 A | 9/1987 | Morishita et al. | |
| 4,846,313 A | 7/1989 | Sharp | |
| 4,938,435 A | 7/1990 | Varner et al. | |
| 4,957,644 A | 9/1990 | Price et al. | |
| 4,974,706 A * | 12/1990 | Maji | F16D 37/02 188/164 |
| 5,054,587 A | 10/1991 | Matsui et al. | |
| 5,064,029 A | 11/1991 | Araki et al. | |
| 5,084,640 A | 1/1992 | Morris et al. | |
| 5,205,386 A | 4/1993 | Goodman et al. | |
| 5,248,133 A | 9/1993 | Okamoto et al. | |
| 5,272,938 A | 12/1993 | Hsu et al. | |
| 5,342,000 A | 8/1994 | Berges et al. | |
| 5,392,881 A | 2/1995 | Cho et al. | |
| 5,441,137 A | 8/1995 | Organek et al. | |
| 5,465,815 A | 11/1995 | Ikegami | |
| 5,477,093 A | 12/1995 | Lamb | |
| 5,483,849 A | 1/1996 | Orii et al. | |
| 5,495,131 A | 2/1996 | Goldie et al. | |
| 5,636,804 A | 6/1997 | Jeung | |
| 5,692,693 A | 12/1997 | Yamaguchi | |
| 5,711,404 A | 1/1998 | Lee | |
| 5,712,520 A | 1/1998 | Lamb | |
| 5,722,612 A | 3/1998 | Feathers | |
| 5,742,986 A | 4/1998 | Corrion et al. | |
| 5,779,178 A | 7/1998 | McCarty | |
| 5,791,584 A | 8/1998 | Kuroiwa | |
| 5,822,874 A | 10/1998 | Nemes | |
| 5,862,891 A | 1/1999 | Kröger et al. | |
| 5,928,300 A | 7/1999 | Rogers et al. | |
| 6,041,897 A | 3/2000 | Saumweber et al. | |
| 6,042,517 A | 3/2000 | Gunther et al. | |
| 6,051,897 A | 4/2000 | Wissler et al. | |
| 6,062,350 A | 5/2000 | Spieldiener et al. | |
| 6,086,005 A | 7/2000 | Kobayashi et al. | |
| 6,209,688 B1 * | 4/2001 | Kuwahara | H02K 49/043 188/156 |
| 6,220,403 B1 | 4/2001 | Kobayashi et al. | |
| 6,279,682 B1 | 8/2001 | Feathers | |
| 6,293,376 B1 | 9/2001 | Pribonic | |
| 6,412,611 B1 | 7/2002 | Pribonic | |
| 6,460,828 B1 | 10/2002 | Gersemsky et al. | |
| 6,466,119 B1 * | 10/2002 | Drew | F16D 43/20 310/103 |
| 6,523,650 B1 * | 2/2003 | Pribonic | B60L 7/28 188/165 |
| 6,533,083 B1 | 3/2003 | Pribonic et al. | |
| 6,557,673 B1 | 5/2003 | Desta et al. | |
| 6,561,451 B1 | 5/2003 | Steinich | |
| 6,659,237 B1 | 12/2003 | Pribonic | |
| 6,756,870 B2 | 6/2004 | Kuwahara | |
| 6,793,203 B2 | 9/2004 | Heinrichs et al. | |
| 6,810,997 B2 | 11/2004 | Schreiber et al. | |
| 6,918,469 B1 | 7/2005 | Pribonic et al. | |
| 6,962,235 B2 | 11/2005 | Leon | |
| 6,973,999 B2 | 12/2005 | Ikuta et al. | |
| 7,011,607 B2 | 3/2006 | Kolda et al. | |
| 7,014,026 B2 | 3/2006 | Drussel et al. | |
| 7,018,324 B1 | 3/2006 | Lin | |
| 7,279,055 B2 | 10/2007 | Schuler | |
| 7,281,612 B2 | 10/2007 | Hsieh | |
| 7,281,620 B2 | 10/2007 | Wolner et al. | |
| 7,513,334 B2 | 4/2009 | Calver | |
| 7,528,514 B2 | 5/2009 | Cruz et al. | |
| 7,984,796 B2 | 7/2011 | Pribonic | |
| 8,037,978 B1 | 10/2011 | Boren | |
| 8,272,476 B2 | 9/2012 | Hartman et al. | |
| 8,424,460 B2 | 4/2013 | Lerner et al. | |
| 8,490,751 B2 | 7/2013 | Allington et al. | |
| 8,511,434 B2 | 8/2013 | Blomberg | |
| 8,556,234 B2 | 10/2013 | Hartman et al. | |
| 8,567,561 B2 | 10/2013 | Strasser et al. | |
| 8,601,951 B2 | 12/2013 | Lerner | |
| 8,851,235 B2 | 10/2014 | Allington et al. | |
| 9,016,435 B2 | 4/2015 | Allington et al. | |
| 9,199,103 B2 | 12/2015 | Hetrich et al. | |
| 9,242,128 B2 | 1/2016 | Macy | |
| 2002/0162477 A1 | 11/2002 | Palumbo | |
| 2002/0179372 A1 | 12/2002 | Schreiber et al. | |
| 2003/0116391 A1 | 6/2003 | Desta et al. | |
| 2003/0168911 A1 | 9/2003 | Anwar | |
| 2003/0211914 A1 | 11/2003 | Perkins et al. | |
| 2004/0055836 A1 | 3/2004 | Pribonic et al. | |
| 2004/0073346 A1 | 4/2004 | Roelleke | |
| 2004/0168855 A1 | 9/2004 | Leon | |
| 2004/0191401 A1 | 9/2004 | Bytnar et al. | |
| 2005/0051659 A1 | 3/2005 | Wolner et al. | |
| 2005/0082410 A1 | 4/2005 | Tanaka et al. | |
| 2005/0117258 A1 | 6/2005 | Ohta et al. | |
| 2005/0189830 A1 | 9/2005 | Corbin, III et al. | |
| 2005/0263356 A1 | 12/2005 | Marzano et al. | |
| 2006/0219498 A1 | 10/2006 | Organek et al. | |
| 2006/0278478 A1 | 12/2006 | Pribonic et al. | |
| 2007/0000741 A1 | 1/2007 | Pribonic et al. | |
| 2007/0001048 A1 | 1/2007 | Wooster et al. | |
| 2007/0135561 A1 | 6/2007 | Rath et al. | |
| 2007/0228202 A1 | 10/2007 | Scharf et al. | |
| 2007/0228713 A1 | 10/2007 | Takemura | |
| 2007/0256906 A1 | 11/2007 | Jin et al. | |
| 2008/0059028 A1 | 3/2008 | Willerton | |

(56) References Cited

U.S. PATENT DOCUMENTS

| | | |
|---|---|---|
| 2008/0074223 A1 | 3/2008 | Pribonic |
| 2008/0087510 A1 | 4/2008 | Pribonic |
| 2008/0105503 A1 | 5/2008 | Pribonic |
| 2008/0106420 A1 | 5/2008 | Rohlf |
| 2008/0135579 A1 | 6/2008 | Bertram et al. |
| 2009/0026303 A1 | 1/2009 | Schmitz et al. |
| 2009/0032785 A1 | 2/2009 | Jones |
| 2009/0084883 A1 | 4/2009 | Casebolt et al. |
| 2009/0114892 A1 | 5/2009 | Lesko |
| 2009/0166459 A1 | 7/2009 | Niitsuma et al. |
| 2009/0178887 A1 | 7/2009 | Reeves et al. |
| 2009/0211846 A1 | 8/2009 | Taylor |
| 2009/0319212 A1 | 12/2009 | Cech et al. |
| 2010/0032255 A1 | 2/2010 | Conti et al. |
| 2010/0065373 A1 | 3/2010 | Stone et al. |
| 2010/0112224 A1 | 5/2010 | Lott |
| 2010/0116922 A1 | 5/2010 | Choate et al. |
| 2010/0211239 A1 | 8/2010 | Christensen et al. |
| 2011/0084158 A1 | 4/2011 | Meillet et al. |
| 2011/0114907 A1 | 5/2011 | Hartman et al. |
| 2011/0147125 A1 | 6/2011 | Blomberg |
| 2011/0166744 A1 | 7/2011 | Lu et al. |
| 2011/0174914 A1 | 7/2011 | Yang |
| 2011/0175473 A1 | 7/2011 | Kitabatake et al. |
| 2011/0240403 A1 | 10/2011 | Meillet |
| 2011/0297778 A1 | 12/2011 | Meillet et al. |
| 2012/0055740 A1* | 3/2012 | Allington ............. A62B 1/08 182/231 |
| 2012/0118670 A1 | 5/2012 | Olson et al. |
| 2012/0312540 A1 | 12/2012 | Lefebvre |
| 2013/0048422 A1 | 2/2013 | Hartman et al. |
| 2013/0087433 A1 | 4/2013 | Sejourne |
| 2013/0118842 A1 | 5/2013 | Lerner |
| 2013/0186721 A1 | 7/2013 | Bogdanowicz et al. |
| 2014/0048639 A1 | 2/2014 | Allington et al. |
| 2014/0110947 A1 | 4/2014 | Mongeau |
| 2014/0224597 A1 | 8/2014 | Takezawa et al. |
| 2014/0346909 A1 | 11/2014 | Vogler et al. |
| 2014/0375158 A1 | 12/2014 | Allington et al. |
| 2015/0196820 A1 | 7/2015 | Allington et al. |
| 2015/0266454 A1 | 9/2015 | McGowan |
| 2015/0352380 A1 | 12/2015 | Huang et al. |
| 2016/0052401 A1 | 2/2016 | McGowan et al. |
| 2016/0317936 A1 | 11/2016 | Diehl et al. |
| 2016/0360738 A1 | 12/2016 | Richardson |
| 2017/0237313 A1 | 8/2017 | Diehl et al. |
| 2017/0244313 A1 | 8/2017 | Diehl et al. |
| 2017/0274261 A1 | 9/2017 | Allington et al. |
| 2017/0328424 A1 | 11/2017 | Allington et al. |
| 2017/0338728 A1 | 11/2017 | Diehl et al. |
| 2018/0264296 A1 | 9/2018 | Diehl et al. |
| 2018/0269768 A1 | 9/2018 | Diehl et al. |
| 2018/0269769 A1 | 9/2018 | Allington et al. |
| 2018/0370484 A1 | 12/2018 | Diehl et al. |

FOREIGN PATENT DOCUMENTS

| | | | |
|---|---|---|---|
| CN | 202203305 U | | 4/2012 |
| CN | 102497085 A | * | 6/2012 |
| CN | 102497085 A | | 6/2012 |
| CN | 102627063 A | | 8/2012 |
| CN | 103244577 A | | 8/2013 |
| CN | 103326538 A | | 9/2013 |
| DE | 93 00 966 U1 | | 3/1993 |
| DE | 10 2005 032 694 A1 | | 1/2007 |
| EP | 0 247 818 A2 | | 12/1987 |
| EP | 0 460 494 A1 | | 12/1991 |
| EP | 0 909 684 A2 | | 4/1999 |
| EP | 1 094 240 A2 | | 4/2001 |
| EP | 1 401 087 A1 | | 3/2004 |
| EP | 1 432 101 A1 | | 6/2004 |
| EP | 1 480 320 A1 | | 11/2004 |
| EP | 1 564 868 A1 | | 8/2005 |
| EP | 1 244 565 B1 | | 7/2006 |
| GB | 721748 A | | 1/1955 |
| GB | 908128 A | | 10/1962 |
| GB | 2 340 461 A | | 2/2000 |
| GB | 2 352 644 A | | 2/2001 |
| GB | 2 352 645 A | | 2/2001 |
| GB | 2 352 784 A | | 2/2001 |
| GB | 2 357 563 A | | 6/2001 |
| JP | 49-097163 A | | 9/1974 |
| JP | S53-113528 U | | 9/1978 |
| JP | 56-107092 | | 8/1981 |
| JP | 58-25152 U | | 2/1983 |
| JP | 60-259278 A | | 12/1985 |
| JP | 63-64542 A | | 3/1988 |
| JP | 5-296287 A | | 11/1993 |
| JP | H05-84347 U | | 11/1993 |
| JP | 8-252025 A | | 10/1996 |
| JP | 10-98868 A | | 4/1998 |
| JP | 10-140536 A | | 5/1998 |
| JP | H10-178717 A | | 6/1998 |
| JP | 10-304799 A | | 11/1998 |
| JP | 11-119680 A | | 4/1999 |
| JP | 11-189701 A | | 7/1999 |
| JP | 11-315662 A | | 11/1999 |
| JP | 2000-189530 A | | 7/2000 |
| JP | 2000-316272 A | | 11/2000 |
| JP | 2001-17041 A | | 1/2001 |
| JP | 2001028876 A | * | 1/2001 |
| JP | 2005-353123 A | | 12/2005 |
| JP | 2012-152316 A | | 8/2012 |
| RU | 106 462 U1 | | 7/2011 |
| WO | 95/16496 A1 | | 6/1995 |
| WO | 96/17149 A1 | | 6/1996 |
| WO | 98/47215 A1 | | 10/1998 |
| WO | 01/38123 A1 | | 5/2001 |
| WO | 03/055560 A1 | | 7/2003 |
| WO | 2007/060053 A1 | | 5/2007 |
| WO | 2008/139127 A1 | | 11/2008 |
| WO | 2009/013479 A1 | | 1/2009 |
| WO | 2009/047469 A1 | | 4/2009 |
| WO | 2009/108040 A1 | | 9/2009 |
| WO | 2009/127142 A1 | | 10/2009 |
| WO | 2010/104405 A2 | | 9/2010 |

OTHER PUBLICATIONS

Kobayashi et al, Eddy Current Speed Reducer, Jan. 30, 2001, Isuzu Motors Ltd, JP 2001028876 (English Machine Translation) (Year: 2001).*

Final Office Action, dated Feb. 28, 2017, for U.S. Appl. No. 14/464,255, Allington et al., "Braking Mechanisms," 10 pages.

Notice of Allowance, dated Jul. 21, 2014, for U.S. Appl. No. 13/255,625, Allington et al., "Braking Mechanisms," 11 pages.

Office Action, dated Aug. 22, 2017, for U.S. Appl. No. 14/464,255, Allington et al., "Braking Mechanisms," 5 pages.

Office Action, dated Feb. 20, 2018, for U.S. Appl. No. 14/464,255, Allington et al., "Braking Mechanisms," 15 pages.

Office Action, dated Jan. 17, 2018, for U.S. Appl. No. 15/586,111, Allington et al., "Braking Mechanisms," 15 pages.

Office Action, dated Jan. 9, 2014, for U.S. Appl. No. 13/255,625, Allington et al., "Braking Mechanisms," 9 pages.

Office Action, dated Jul. 25, 2016, for U.S. Appl. No. 14/464,255, Allington et al., "Braking Mechanisms," 10 pages.

International Search Report and Written Opinion, dated Apr. 1, 2016, for International Application No. PCT/NZ2015/050206, 9 pages.

International Search Report and Written Opinion, dated Feb. 13, 2009, for International Application No. PCT/US2008/087863, 15 pages.

International Search Report and Written Opinion, dated Feb. 23, 2011, for International Application No. PCT/NZ2010/000011, 10 pages.

International Search Report and Written Opinion, dated Feb. 24, 2016, for International Application No. PCT/NZ2015/050207, 10 pages.

International Search Report and Written Opinion, dated Jan. 29, 2016, for International Application No. PCT/NZ2015/050208, 11 pages.

(56) References Cited

OTHER PUBLICATIONS

International Search Report and Written Opinion, dated Mar. 11, 2015, for International Application No. PCT/NZ2014/000245, 8 pages.
International Search Report and Written Opinion, dated Mar. 18, 2016, for International Application No. PCT/NZ2015/050209, 14 pages.
International Search Report and Written Opinion, dated Mar. 29, 2016, for International Application No. PCT/NZ2015/050205, 10 pages.
International Search Report and Written Opinion, dated Nov. 11, 2015, for International Application No. PCT/NZ2015/050114, 10 pages.
International Search Report and Written Opinion, dated Nov. 18, 2015, for International Application No. PCT/NZ2015/050113, 9 pages.
International Search Report and Written Opinion, dated Oct. 26, 2015, for International Application No. PCT/NZ2015/050115, 10 pages.
MSA Safety Incorporated, Auto Belay Stop Use Notice, Oct. 15, 2009, URL=http://verticalendeavors.com/minneapolis/auto-belay-stop-us-notice/, download date Apr. 6, 2017, 2 pages.
North Safety Products Europe B.V., "Climbing Wall Descender: FP2/5**GDD," *Climbing Wall Descent Controllers Instruction Manual v3*, Aug. 18, 2008, 20 pages.
Trublue Auto Belays, Model TB150-12C Operator Manual, Jun. 20, 2013, 37 pages.
Park et al., "Torque analysis and measurements of a permanent magnet type Eddy current brake with a Halbach magnet array based on analytical magnetic field calculations," *Journal of Applied Physics 115*(17):17E707, 2014. (3 pages).
Extended European Search Report, dated Mar. 29, 2018, for European Application No. 15834380.6-1201, 12 pages.
Extended European Search Report, dated Apr. 6, 2018, for European Application No. 15864540.8-1201, 26 pages.
Extended European Search Report, dated Jul. 11, 2017, for European Application No. 14872681.3-1809, 10 pages.

* cited by examiner

METHODS OF ALTERING EDDY CURRENT INTERACTIONS

BACKGROUND

Technical Field

Described herein are braking mechanisms and methods of braking relative movement between members. More specifically, braking mechanisms and related methods of use are described herein using eddy current interactions to resist relative movement between members, the magnetic flux about an eddy current region being modified beyond that for an inherent drag effect resulting from a simple magnetic pole arrangement.

Description of the Related Art

Art devices may utilize eddy current drag forces to impart a drag force on a conductive member undergoing relative movement with respect to a magnetic field. Eddy current drag effects impart frictionless retarding forces and hence may be useful for various braking applications, particularly where wear and tear effects are not desirable. Eddy current effects are also able to be tuned to suit various applications, some examples being described in the inventor's other applications.

One aspect of eddy current drag force interactions is that the magnetic field strength has a squared relationship on brake torque. In other words, a small increase in magnetic field strength can lead to dramatic increases in eddy current drag force.

The applicant's co-pending and granted patents in the field of eddy current related devices include U.S. Pat. Nos. 8,851,235, 8,490,751, NZ619034, NZ627617, NZ627619, NZ627633, NZ627630 and other equivalents all incorporated herein by reference. While the devices described in these patents/applications may be useful, other methods of altering eddy current interactions such as by increasing magnetic flux density may be useful or at least provide the public with a choice.

Further aspects and advantages of the braking mechanisms and methods of braking relative movement should become apparent from the ensuing description that is given by way of example only.

BRIEF SUMMARY

Described herein are braking mechanisms and related methods of use using eddy current interactions to resist relative movement between members, the magnetic flux about an eddy current region being modified beyond an inherent drag effect resulting from an unaltered magnetic field resulting from a simple magnetic pole arrangement.

In a first aspect, there is provided a braking mechanism comprising:

at least one magnetic field provided by magnetic elements causing a magnetic flux about a predetermined region;

at least one magnetic flux density modifying means;

at least one conductive member or a part thereof that interacts with the predetermined region; and, as the at least one conductive member or a part thereof interacts with the predetermined region, eddy current drag forces are generated resisting relative movement between the at least one conductive member or a part thereof and the magnetic field.

In a second aspect, there is provided a braking mechanism comprising:

at least one magnetic field provided by magnetic elements and magnetic cladding about the magnetic elements, the cladding at least partly modifying the magnetic flux about a predetermined region; and at least one conductive member or a part thereof that interacts with the predetermined region; and, as the at least one conductive member or a part thereof interacts with the predetermined region, eddy current drag forces are generated resisting relative movement between the at least one conductive member or a part thereof and the magnetic field.

In a third aspect, there is provided a braking mechanism comprising:

at least one magnetic field positioned to form a Halbach array provided by magnetic elements, the Halbach array modifying the magnetic flux about a predetermined region or regions;

at least one conductive member or a part thereof that interacts with the predetermined region; and, as the at least one conductive member or a part thereof interacts with the predetermined region, eddy current drag forces are generated resisting relative movement between the at least one conductive member or a part thereof and the magnetic field.

In a fourth embodiment, there is provided a braking mechanism comprising:

at least one magnetic field provided by magnetic elements causing a magnetic flux about a predetermined region;

at least one conductive member or a part thereof that interacts with the predetermined region;

ferro-fluid located at least partly about the magnetic elements and at least one conductor member or a part thereof thereby modifying the magnetic flux density of the predetermined region; and, as the at least one conductive member or a part thereof passes through the predetermined region, eddy current drag forces are generated resisting relative movement between the at least one conductive member or a part thereof and the magnetic field.

In a fifth embodiment, there is provided a braking mechanism comprising:

at least one magnetic field provided by magnetic elements causing a magnetic flux about a predetermined region;

at least one conductive member or a part thereof that interacts with the predetermined region;

magnetic flux density modifying means located on and/or in the at least one conductor or part thereof that increases conductivity between the magnetic elements and the at least one conductor or a part thereof thereby modifying magnetic flux density about the region; and, as the at least one conductive member or a part thereof passes through the predetermined region, eddy current drag forces are generated resisting relative movement between the at least one conductive member or a part thereof and the magnetic field.

In a sixth aspect, there is provided a method of controlling relative movement between members, the method comprising the step of:

(a) selecting at least one braking mechanism substantially as described above;

(b) linking at least one first member with the magnetic elements and linking at least one further member with the conductor or conductors;

(c) imposing a motive force on a member or the members and utilizing the resulting eddy current drag force generated from the braking mechanism to resist relative movement between the members.

Advantages of the above described braking mechanisms and methods of use include the ability to modify and tune the retarding force. One embodiment allows the ability to potentially cause a much larger retarding force than would be the case if no magnetic flux density increasing options were used.

BRIEF DESCRIPTION OF THE SEVERAL VIEWS OF THE DRAWINGS

Further aspects of braking mechanisms and methods of braking relative movement will become apparent from the following description that is given by way of example only and with reference to the accompanying drawings in which.

DETAILED DESCRIPTION

As noted above, braking mechanisms and related methods of use are described herein using eddy current interactions to resist relative movement between members, the magnetic flux about an eddy current region being modified beyond an inherent drag effect resulting from an unaltered magnetic field resulting from a simple magnetic pole arrangement.

For the purposes of this specification, the term 'about' or 'approximately' and grammatical variations thereof mean a quantity, level, degree, value, number, frequency, percentage, dimension, size, amount, weight or length that varies by as much as 30, 25, 20, 15, 10, 9, 8, 7, 6, 5, 4, 3, 2, or 1% to a reference quantity, level, degree, value, number, frequency, percentage, dimension, size, amount, weight or length.

The term 'substantially' or grammatical variations thereof refers to at least about 50%, for example 75%, 85%, 95% or 98%.

The term 'comprise' and grammatical variations thereof shall have an inclusive meaning—i.e. that it will be taken to mean an inclusion of not only the listed components it directly references, but also other non-specified components or elements.

The term 'modify' and grammatical variations thereof in the context of magnetic flux refers to either one or all of directing, intensifying, reducing, retarding, or increasing the density of magnetic flux in or about a predetermined region.

The term 'unaltered magnetic effect' or 'simple magnetic pole arrangement' and grammatical variations thereof refers to a resistance of movement effect on an electrically conductive element, the unaltered effect being that observed for a simple (e.g. north/south) pole arrangement or arrangements without a magnetic flux modifying effect. One example of an altered effect may be by using a magnetic flux redirecting or concentrating means.

In a first aspect, there is provided a braking mechanism comprising:

at least one magnetic field provided by magnetic elements causing a magnetic flux about a predetermined region;

at least one magnetic flux density modifying means;

at least one conductive member or a part thereof that interacts with the predetermined region; and, as the at least one conductive member or a part thereof interacts with the predetermined region, eddy current drag forces are generated resisting relative movement between the at least one conductive member or a part thereof and the magnetic field.

In a second aspect, there is provided a braking mechanism comprising:

at least one magnetic field provided by magnetic elements and magnetic cladding about the magnetic elements, the cladding at least partly modifying the magnetic flux about a predetermined region; and at least one conductive member or a part thereof that interacts with the predetermined region; and, as the at least one conductive member or a part thereof interacts with the predetermined region, eddy current drag forces are generated resisting relative movement between the at least one conductive member or a part thereof and the magnetic field.

The magnetic cladding may be formed around at least part of each magnetic element. The cladding may enclose substantially all of the magnetic elements to limit and/or direct substantially all of the field generated.

The braking mechanism may comprise a magnetic circuit made up of at least two magnetic fields provided by magnetic elements and magnetic cladding about the magnetic elements, the cladding at least partly modifying the magnetic flux about at least two predetermined regions; and at least one conductive member or part thereof that interacts with the predetermined regions. As noted, the magnetic circuit may be formed by using two opposing sets of magnetic elements and cladding, a gap being located about the predetermined region and the at least one conductive member or a part thereof pass through the region(s).

The two predetermined regions in a circuit may be located opposite each other. This alignment may be useful for conductor shape and design but not essential.

The conductive member may be rotor shaped. Alternatively, the conductive member may be rod shaped. The term rod refers to an elongated solid that may be curvilinear shaped but could also have polygonal cross-section. The rod may be solid or hollow.

The magnetic field may comprise one north polarity facing magnet element and one south polarity facing magnet element aligned so as to form a magnetic field between the elements.

The predetermined region may be located about an area of maximum magnetic flux density. The predetermined region may be located immediately between the magnetic elements.

This is typically the space immediately between the magnetic poles but may be at other points such as that which may be generated from a Halbach array noted in more detail below.

The predetermined region may have a gap through which the conductive member or members may pass.

In a third aspect, there is provided a braking mechanism comprising:

at least one magnetic field positioned to form a Halbach array provided by magnetic elements, the Halbach array modifying the magnetic flux about a predetermined region or regions;

at least one conductive member or a part thereof that interacts with the predetermined region; and, as the at least one conductive member or a part thereof interacts with the predetermined region, eddy current drag forces are generated resisting relative movement of the at least one conductive member or a part thereof and the magnetic field.

In one embodiment the Halbach array may comprise a magnetic array arranged in a semi-circle shape, the predetermined region being of the highest magnetic flux density within the circular region.

The at least one conductor may have various shapes, examples being circular, spherical, ovoid and toroid shaped. The at least one conductor or a part thereof may pass through the center of the Halbach array.

Irrespective of shape, the at least one conductor member or a part thereof may be solid or segmented. If the conductor is segmented, each segment may for example move about the toroid axis in conjunction with driving conductor movement about a primary axis thereby generating even greater eddy current drag force from both conductor and segment movement.

In a fourth aspect, there is provided a braking mechanism comprising:

at least one magnetic field provided by magnetic elements causing a magnetic flux about a predetermined region;

at least one conductive member or a part thereof that interacts with the predetermined region;

ferro-fluid located at least partly about the magnetic elements and at least one conductor member or a part thereof thereby modifying the magnetic flux density of the predetermined region; and, as the at least one conductive member or a part thereof passes through the predetermined region, eddy current drag forces are generated resisting relative movement between the at least one conductive member or a part thereof and the magnetic field.

As noted above, a gap may exist between the magnetic elements that the at least one conductor member or a part thereof passes through. Backing plates may be used behind the magnetic elements to seal the magnetic elements and the at least one conductor or a part thereof within a backing plate cavity. The free space within the backing plate cavity may be filled with ferro-fluid. Sealing refers to the magnetic elements and the at least one conductor being enclosed within other elements to form a sealed region. The seal may be impermeable preventing loss of materials, e.g. ferro fluid, out of the sealed region.

In an alternative embodiment to the above, the magnetic elements may be spaced apart by use of separators or barriers. These barriers may also reduce the cavity size in which ferro-fluid is placed. The barriers may also prevent 'short circuiting' of the magnetic fields outside of the region of the conductor.

In a further embodiment, the braking mechanism may comprise backing plates as above with magnetic elements therein. Two conductor plates may be located between the magnetic elements defining a cavity or space between the conductor plates. The cavity or space between the conductors may be filled with a ferro-fluid.

In the above embodiment, the ferro-fluid may also have fluid properties that inhibit conductor movement thereby further enhancing a drag effect. Fluid properties may refer to the fluid viscosity—viscous drag being a known means to absorb kinetic or motive energy. In this example, fluid properties such as conductivity and viscosity may be varied to alter the drag force dynamics.

In a fifth aspect, there is provided a braking mechanism comprising:

at least one magnetic field provided by magnetic elements causing a magnetic flux about a predetermined region;

at least one conductive member or a part thereof that interacts with the predetermined region;

magnetic flux density modifying means located on and/or in the at least one conductor or part thereof that increases magnetic 'conductivity' between the magnetic elements and the at least one conductor or a part thereof thereby modifying magnetic flux density about the region; and, as the at least one conductive member or a part thereof passes through the predetermined region, eddy current drag forces are generated resisting relative movement between the at least one conductive member or a part thereof and the magnetic field.

The at least one conductor or a part thereof may modify the magnetic flux through use of additives such as particles or nano-particles located on or in part of or all of the conductor(s). The particles may be manufactured from various magnetic flux enhancing materials including for example iron and nickel. The particles may be formed into the conductors, bonded to the conductor exterior and/or laminated to the conductor exterior.

The various braking mechanisms described above may take a wide range of final topologies including linear motion, rotary motion, polar motion, axial motion and so forth. These ranges of topology can be combined to achieve various types of relative movement between the magnetic field(s) and the conductor(s).

In addition to the varying topologies noted above, the conductor shape itself may also be varied for example to optimize the space and overall braking mechanism size and shape. For example, the conductor may have fins and the fins may act as conductor parts that pass through the regions in this embodiment, the fins may extend from a central hub in different directions thereby optimizing the conductive surface passing through multiple magnetic flux regions.

In a sixth aspect, there is provided a method of controlling relative movement between members, the method comprising the step of:

(a) selecting at least one braking mechanism substantially as described above;

(b) linking at least one first member with the magnetic elements and linking at least one further member with the conductor or conductors;

(c) imposing a motive force on a member or the members and utilizing the resulting eddy current drag force generated from the braking mechanism to resist relative movement between the members.

Final embodiments for the braking mechanisms described herein may be varied. The magnetic field sections may for example be linked to a first member of a braking mechanism and the conductor member or members linked to a second member. For example, an autobelay or self-retracting lifeline (SRL) embodiment may use the braking mechanisms. In this embodiment, the conductor may for example be linked to a line on a spool and the magnetic field sections may be linked to a separate rotor and, when the line extends at a predetermined rate, potentially equating to a fall, the conductor and magnetic elements interact to brake pay out of the line and prevent an accident by braking the fall. This example should not be seen as limiting since the braking mechanisms described may be used for a wide variety of other applications, non-limiting examples including speed control of:

- a rotor in a rotary turbine;
- exercise equipment e.g. rowing machines, epicyclic trainers;
- roller-coasters and other amusement rides;
- Elevator and escalator systems;
- evacuation descenders and fire escape devices;
- conveyer systems:
- rotary drives in factory production facilities;
- materials handling devices such as conveyer belts or a braking device in a chute;
- dynamic display signage to control the rate of change of rotating signs;
- roadside safety systems e.g. the eddy current brake may be connected in a system to provide crash attenuation though the dissipation of energy via the brake;
- seat belts in vehicles;
- zip lines;
- braking mechanisms for trolleys and carriages.

Advantages of the above described braking mechanisms and methods of use include the ability to modify and tune the braking force and potentially cause a much larger braking force than would be the case if no magnetic flux density increasing options were used.

The embodiments described above may also be said broadly to consist in the parts, elements and features referred to or indicated in the specification of the application, individually or collectively, and any or all combinations of any two or more said parts, elements or features.

Further, where specific integers are mentioned herein which have known equivalents in the art to which the embodiments relate, such known equivalents are deemed to be incorporated herein as of individually set forth.

WORKING EXAMPLES

The above described braking mechanisms and methods of use are now described by reference to specific examples.

Example 1

Referring to FIGS. 1 to 4, magnetic cladding embodiments are described as a means to modify the magnetic flux by directing and increasing the flux density about a region.

Figure 1A:
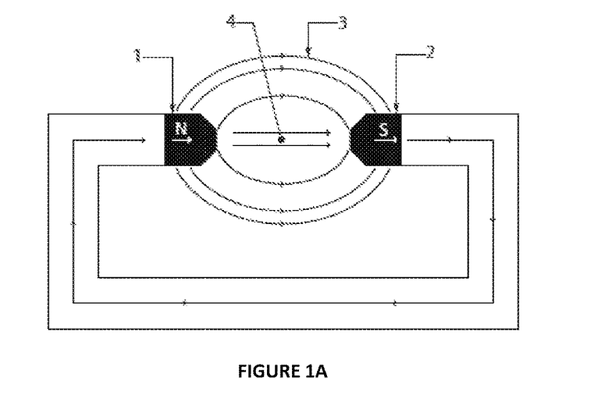
FIG. 1A illustrates a typical magnetic field about north and south magnetic poles resulting from interaction of magnetic elements configured in a simple magnetic pole arrangement without modification of the magnetic flux density.
Figure 1B:
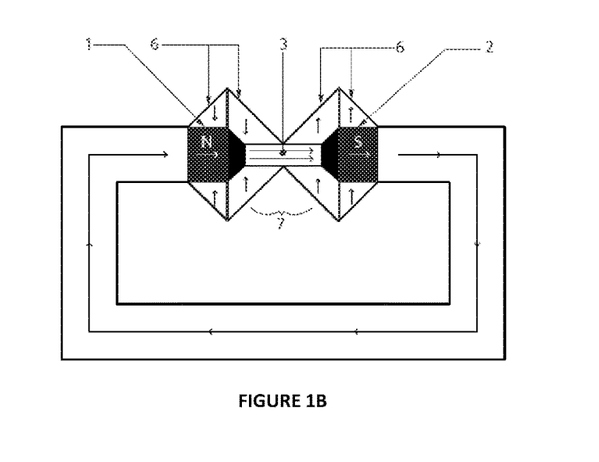
FIG. 1B illustrates a magnetic field subjected to magnetic cladding.

FIG. 1A illustrates, an unclad magnetic field. The magnetic field 3 includes two magnetic elements (a north 1 and south 2 pole) and the magnetic field 3 generated follows a classic field path about the poles 1,2, the strongest flux region 4 being directly between the elements 1,2. FIG. 1B illustrates how the field 3 changes when magnetic cladding 6 is used. The cladding 6 shown directs and increases the magnetic flux density about a predetermined region, in the example being the space 7 immediately between the magnetic elements 1, 2.

Figure 2:
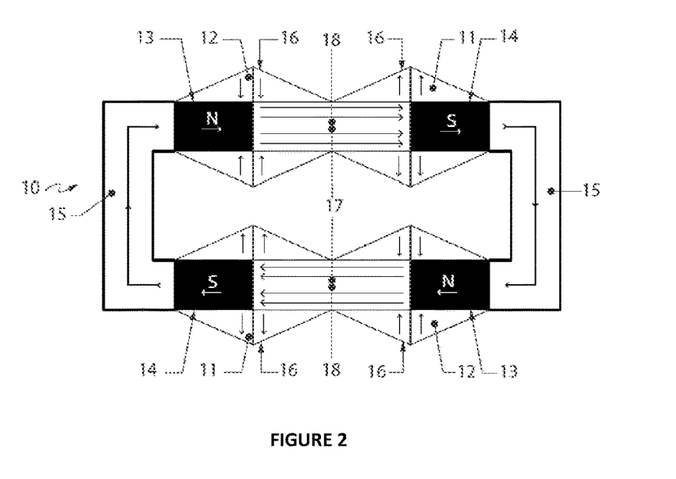
FIG. 2 illustrates an alternative example of a magnetic circuit subject to magnetic cladding.

FIG. 2 illustrates a magnetic circuit 10. The circuit 10 is established with magnet elements 13, 14 establishing a pole pair. The magnet elements 13, 14 are linked together with a structural material 15 that is of high magnetic permeability, forming a magnetic circuit. Cladding is established with magnets 12 adjacent to the field magnets 13, 14. Further cladding 16 is provided adjacent to the gap region 18. The magnetic field of cladding magnets 12, 16, focus and intensify a resulting magnetic field in the gap region 18.

Figure 3:
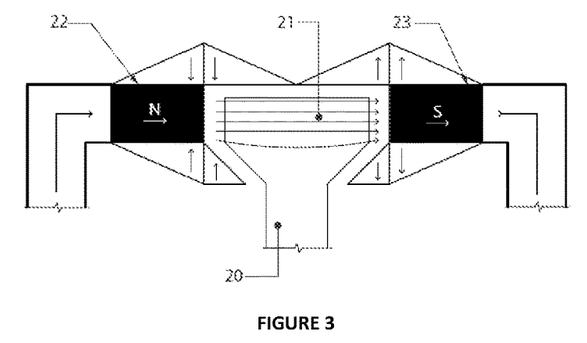
FIG. 3 illustrates an alternative braking mechanism using magnetic cladding and a conductor.
Figure 4:
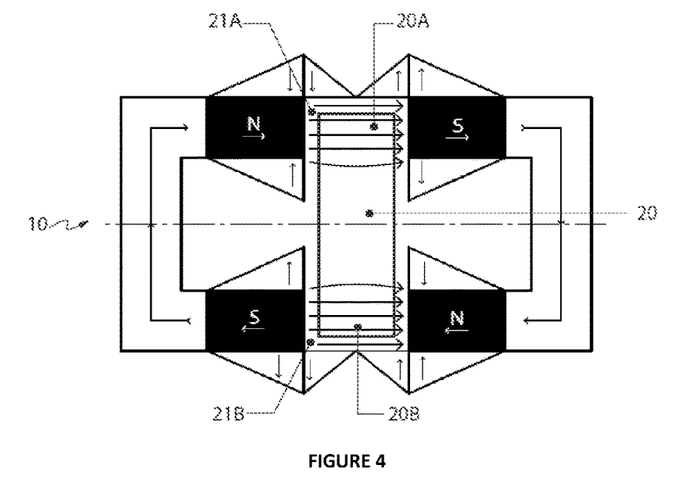
FIG. 4 illustrates an alternative example of a braking mechanism using magnetic cladding and a magnetic circuit.

FIGS. 3 and 4 illustrate potential braking mechanisms utilizing the cladded magnetic fields of FIGS. 1 and 2 in conjunction with a conductor member 20 that passes through the region(s) 21. In FIG. 3, the conductor 20 has an elongated foot ending that passes through the region 21. As this happens, eddy current drag forces act on the conductor 20 to slow or resist relative movement between the magnetic elements 22,23 and the conductor 20. FIG. 4 illustrates a conductor 20 moving through the magnetic circuit 10 of FIG. 2, in this case with two sections 20A,20B of the conductor member 20 interacting with the different magnetic regions 21A,21B and thereby increasing the potential eddy current drag forces.

Note that movement of the conductor member relative to the magnetic field(s) may be linear, rotational or in various directions and the examples shown should not be seen as limiting. The conductor shape may also take various forms including rod shapes or rotor shapes for example.

Also note that the important aspect is different relative movement between the magnetic elements and conductor member or members. For example, the magnetic elements may be stationary and the conductor member(s) move. Alternatively, the conductor member(s) may remain stationary and the magnetic elements may move. In a further alternative, both the magnetic elements and conductor member(s) may move but with different velocities and potentially also different movement directions.

Example 2

Halbach arrays may also be used as a means to direct and increase the density of the magnetic flux about a predetermined region.

Figure 5:
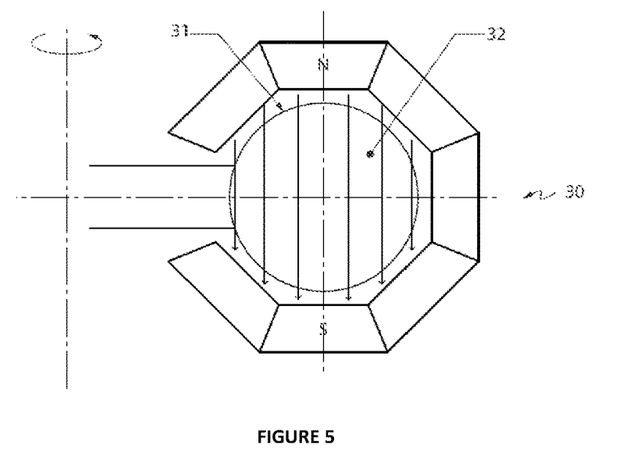
FIG. 5 illustrates a braking mechanism using a toroid conductor passing through a Halbach array.

FIG. 5 shows an example of a potential braking mechanism utilizing a Halbach array. In this example, the magnetic array 30 is arranged in a semi-circular shape and the Halbach array intensifies the magnetic flux in the predetermined region 31 within the circular region. A conductor 32 passes through the semi-circular region 31 generating eddy current drag forces as this occurs. In FIG. 5, the conductor member 32 has a toroid shape however, various shapes could be used.

Example 3

Figure 6:
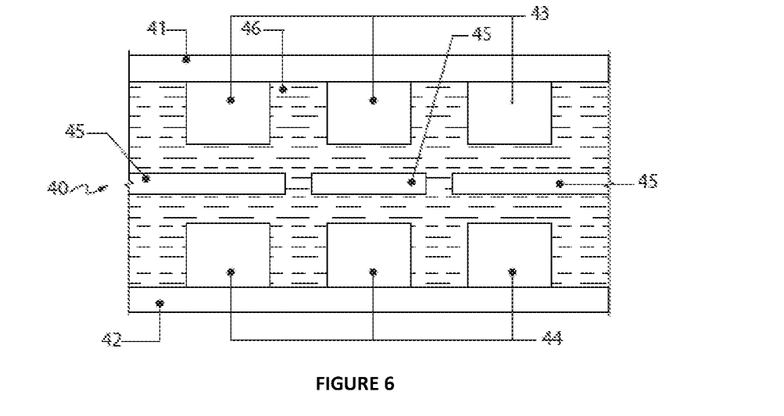
FIG. 6 illustrates a ferro-fluid braking mechanism embodiment.
Figure 7:
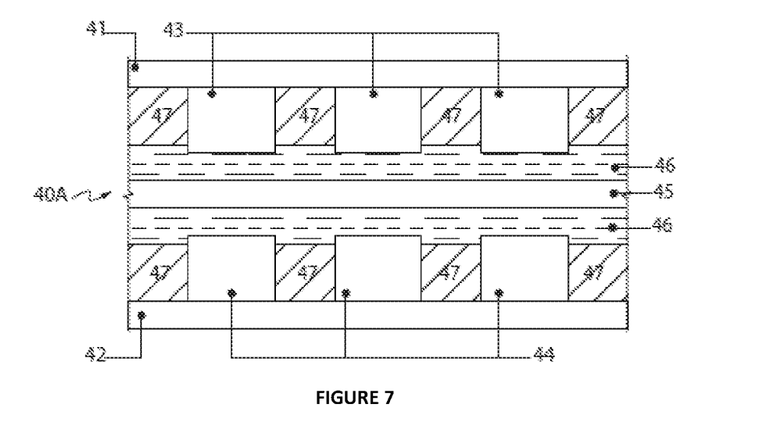
FIG. 7 illustrates an alternative a ferro-fluid braking mechanism embodiment.
Figure 8:
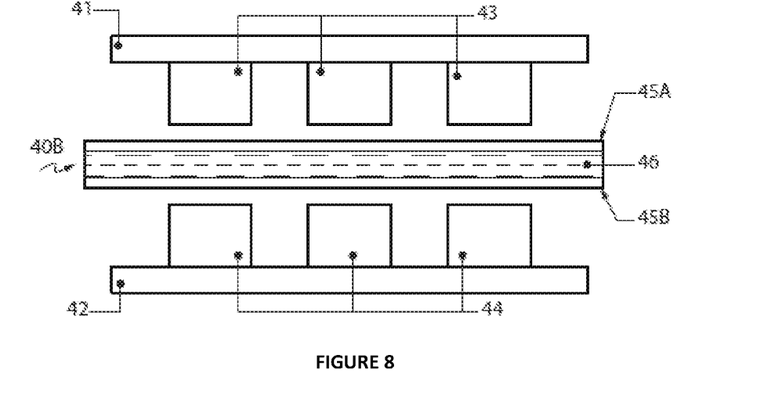
FIG. 8 illustrates a further alternative ferro-fluid braking mechanism embodiment.

FIGS. 6 to 8 illustrate alternative embodiments utilizing a ferro-fluid to modify the magnetic flux density by increasing the magnetic permeability between the magnetic elements and conductor.

FIG. 6 illustrates an embodiment where the braking mechanism 40 comprises two backing plates 41,42, magnetic elements 43,44 extending orthogonally from the backing plates 41,42 and a gap between the magnetic elements 43,44 that a conductor or conductors 45 pass through. The backing plates 41,42 seal the magnetic elements 43,44 and conductor 45 within a cavity. The free space within the cavity may then be filled with the ferro-fluid 46 noted above. When relative movement occurs, eddy current drag forces are generated resisting the relative movement.

FIG. 7 shows an alternative embodiment 40A, where the magnetic elements 43,44 are spaced apart by use of separators or barriers 47 and these barriers also reduce the cavity size in which ferro-fluid 46 is placed. The barriers 47 may prevent short circuiting of the magnetic fields and may reduce the amount of ferro-fluid 46 required. The barriers 47 may extend past the extent of the magnetic element 43, 44 to further reduce the cavity size and short circuiting of the magnetic fields.

FIG. 8 shows a further embodiment 40B, the braking mechanism comprising backing plates 41,42 as above with magnetic elements 43,44 therein. Two conductor plates 45A,45B may be located between the magnetic elements 43,44 defining a cavity or space between the conductor plates 45A,45B. The cavity or space between the conductor plates 45A,45B may be filled with a ferro-fluid 46.

In the above embodiments, the ferro-fluid 46 may also have fluid properties such as a viscous drag that inhibit conductor 45, 45A, 45B movement thereby further enhancing a drag effect.

Example 4

Figure 9:
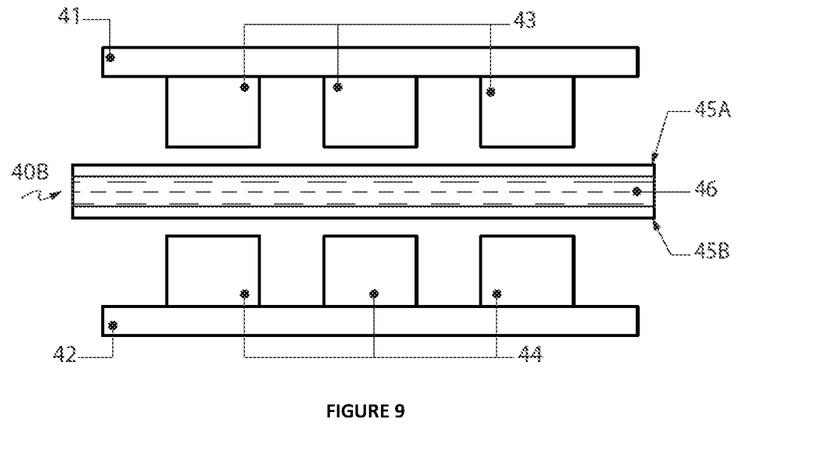
FIG. 9 illustrates a modified conductor using additives in the conductor to enhance the magnetic flux.

FIG. 9 illustrates a further braking mechanism 50, the mechanism 50 comprising the same backing plates 51,52 and magnetic elements 53,54 as FIGS. 6 to 8, however, instead of a ferro-fluid, the magnetic flux direction and density is modified by the use of magnetic flux modifying materials in the form of particles or additives 55 mixed in or placed on the conductor member 56. The additives/particles 55 may be located on or in the conductor member(s) 56. The particles 55 may be manufactured from various magnetic flux enhancing materials including for example iron and nickel. The particles 55 may be formed into the conductor member(s) 56, bonded to the conductor member 56 exterior and/or laminated to the conductor member 56 exterior. In FIG. 9, the particles 55 are spread evenly throughout the conductor member 56 structure.

Example 5

Figure 10:
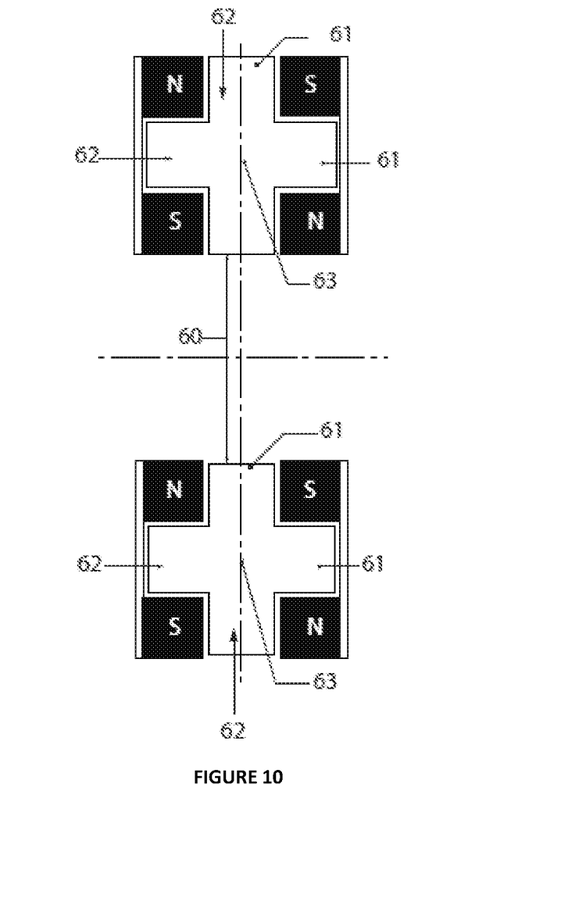
FIG. 10 illustrates a potential compact shape of braking mechanism.

As noted above, the conductor member and magnetic field may take various shapes and forms. Some braking mechanisms may require compact forms or topologies. One way of achieving a compact form may be to use a conductor 60 with fins 61, the fins 61 acting as conductor 60 parts that pass through the flux regions 62 as shown in FIG. 10. In this embodiment, the fins 61 extend from a central hub 63 in different directions thereby optimizing the conductive surface passing through multiple magnetic flux regions 62.

Aspects of braking mechanisms and methods of braking relative movement have been described by way of example only and it should be appreciated that modifications and additions may be made thereto without departing from the scope of the claims herein.

These and other changes can be made to the embodiments in light of the above-detailed description. In general, in the following claims, the terms used should not be construed to limit the claims to the specific embodiments disclosed in the specification and the claims, but should be construed to include all possible embodiments along with the full scope of equivalents to which such claims are entitled. Accordingly, the claims are not limited by the disclosure.

What is claimed is:

1. A braking mechanism comprising:
   at least one magnetic field provided by magnetic elements, the magnetic elements including one north polarity facing magnet element and one south polarity facing magnet element aligned so as to cause a magnetic field between the north polarity facing magnet element and the south polarity facing magnet element and about a predetermined region, the predetermined region located between the north polarity facing magnet element and the south polarity facing magnet element;
   at least one additional magnet in the form of magnetic cladding about the north and south polarity facing magnet elements, the magnetic cladding acting to modify a magnetic flux density about the predetermined region between the north polarity facing magnet element and the south polarity facing magnet element; and
   at least one conductive member or a part thereof;
   wherein, when the at least one conductive member or part thereof does not interact with the predetermined region, independent movement occurs between the conductive member and the predetermined region, and, when the at least one conductive member or part thereof interacts with the predetermined region, eddy current drag forces are generated resisting relative movement and urging dependent movement between the at least one conductive member or part thereof and the predetermined region,
   wherein the at least one conductive member is a rotor;
   wherein the magnetic cladding substantially extends across an axial width of the rotor, and faces toward an axis of the rotor, and the north polarity facing magnet element and south polarity facing magnet element face opposite sides of the rotor, the north and south polarity facing magnet elements and magnetic cladding together substantially surrounding a part of a periphery of the rotor when the rotor interacts with the predetermined region, wherein magnetic field lines of the magnetic field pass through the predetermined region substantially parallel to the axis of the rotor;
   wherein the magnetic cladding encloses substantially all of the magnetic elements to direct substantially all of the magnetic field; and
   wherein the predetermined region has a gap through which the conductive member passes.

2. The braking mechanism as claimed in claim 1 wherein magnetic cladding is formed around at least part of each magnetic element.

3. The braking mechanism as claimed in claim 1 wherein the mechanism further comprises:
   a magnetic circuit made up of at least two magnetic fields provided by the magnetic elements and the magnetic cladding about the magnetic elements, the cladding at least partly modifying the magnetic flux density about at least two predetermined regions; and
   the at least one conductive member or part thereof that interacts with the predetermined regions;
   wherein the two predetermined regions in a circuit are located opposite each other; and
   wherein the conductive member is rotor-shaped.

4. The braking mechanism as claimed in claim 1 wherein the predetermined region is located about an area of maximum magnetic flux density.

5. The braking mechanism of claim 1 wherein the braking mechanism is incorporated within an autobelay system.

6. The braking mechanism of claim 1 wherein the braking mechanism is incorporated within a self-retracting lifeline (SRL) system.

7. A method of controlling relative movement between members of a braking mechanism comprising:
   at least one magnetic field provided by magnetic elements, the magnetic elements including one north polarity facing magnet element and one south polarity facing magnet element aligned so as to cause a magnetic field between the north polarity facing magnet element and the south polarity facing magnet element and about a predetermined region, the predetermined region located between the north polarity facing magnet element and the south polarity facing magnet element;

at least one additional magnet in the form of magnetic cladding about the north and south polarity facing magnet elements, the magnetic cladding acting to modify a magnetic flux density about the predetermined region between the north polarity facing magnet element and the south polarity facing magnet element; and at least one conductive member or a part thereof;

wherein, when the at least one conductive member or part thereof does not interact with the predetermined region, independent movement occurs between the conductive member and the predetermined region, and, when the at least one conductive member or part thereof interacts with the predetermined region, eddy current drag forces are generated resisting relative movement and urging dependent movement between the at least one conductive member or part thereof and the predetermined region, wherein the at least one conductive member is a rotor;

wherein the magnetic cladding substantially extends across an axial width of the rotor, and faces toward an axis of the rotor, and the north polarity facing magnet element and south polarity facing magnet element face opposite sides of the rotor, the north and south polarity facing magnet elements and magnetic cladding together substantially surrounding a part of a periphery of the rotor when the rotor interacts with the predetermined region, wherein magnetic field lines of the magnetic field pass through the predetermined region substantially parallel to the axis of the rotor;

wherein the magnetic cladding encloses substantially all of the magnetic elements to direct substantially all of the magnetic field;

wherein the predetermined region has a gap through which the conductive member passes; and wherein the method comprises:

linking at least one first member with the magnetic elements and linking at least one further member with the conductive member; and imposing a motive force on the first member or the further member and utilizing a resulting eddy current drag force generated from the braking mechanism to resist relative movement between the first member and the further member.

* * * * *